(12) United States Patent
Frey et al.

(10) Patent No.: US 6,479,417 B2
(45) Date of Patent: *Nov. 12, 2002

(54) GLASS-CERAMIC MICROSPHERES THAT IMPART YELLOW COLOR TO RETROREFLECTED LIGHT

(75) Inventors: Matthew H. Frey, Maplewood, MN (US); Charles J. Studiner, III, Oakdale, MN (US); Kenton D. Budd, Woodbury, MN (US); Toshihro Kasai, Tsukui-gun (JP); Stephen B. Roscoe, St. Paul, MN (US); Chikafumi Yokoyama, Zama (JP); John E. Bailey, Shorewood, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 6 days.

This patent is subject to a terminal disclaimer.

(21) Appl. No.: 09/765,012

(22) Filed: Jan. 18, 2001

(65) Prior Publication Data

US 2002/0013207 A1 Jan. 31, 2002

Related U.S. Application Data

(63) Continuation-in-part of application No. 09/362,323, filed on Jul. 27, 1999, now Pat. No. 6,245,700.

(51) Int. Cl.⁷ .............................................. C03C 12/02
(52) U.S. Cl. .............................. 501/34; 501/3; 501/10; 501/33
(58) Field of Search ................ 501/34, 3, 33, 501/10

(56) References Cited

U.S. PATENT DOCUMENTS

| | | | |
|---|---|---|---|
| 2,354,018 A | 7/1944 | Heltzer et al. | |
| 2,924,533 A | 2/1960 | McMullen | |
| 2,960,594 A | 11/1960 | Thorpe | |
| 2,963,378 A | 12/1960 | Palmquist et al. | |
| 3,145,114 A | 8/1964 | Rindone | |
| 3,149,016 A | 9/1964 | Tung et al. | |
| 3,228,897 A | 1/1966 | Nellessen | |
| 3,294,558 A | 12/1966 | Searight et al. | |
| 3,294,559 A | 12/1966 | Searight et al. | |
| 3,410,185 A | 11/1968 | Harrington | |
| 3,416,936 A | 12/1968 | Sproul, Jr. | |
| 3,432,314 A | 3/1969 | Mazdiyasni et al. | |
| 3,493,403 A | 2/1970 | Tung et al. | |
| 3,560,074 A | 2/1971 | Searight et al. | |
| 3,709,706 A | 1/1973 | Sowman | |
| 3,795,524 A | 3/1974 | Sowman | |
| 3,864,113 A | 2/1975 | Dumbaugh, Jr. | |
| 3,915,771 A | 10/1975 | Gatzke et al. | |
| 4,056,602 A | 11/1977 | Matovich | |
| 4,095,974 A | 6/1978 | Matovich | |
| 4,106,947 A | 8/1978 | Recasens et al. | |
| 4,137,086 A | 1/1979 | Potter et al. | |
| 4,248,932 A | 2/1981 | Tung et al. | |
| 4,367,919 A | 1/1983 | Tung et al. | |
| 4,564,556 A | 1/1986 | Lange | |
| 4,607,697 A | 8/1986 | Urffer | |
| 4,621,936 A | 11/1986 | Hansson et al. | |
| 4,758,469 A | 7/1988 | Lange | |
| 4,772,511 A | 9/1988 | Wood et al. | |
| 4,837,069 A | 6/1989 | Bescup et al. | |
| 4,931,414 A | 6/1990 | Wood et al. | |
| 5,227,221 A | 7/1993 | Hedblom | |
| 5,268,789 A | 12/1993 | Bradshaw | |
| 5,286,682 A | 2/1994 | Jacobs et al. | |
| 5,310,278 A | 5/1994 | Kaczmarczik | |
| 5,502,012 A | 3/1996 | Bert et al. | |
| 5,576,097 A | 11/1996 | Wyckoff | |
| 5,670,209 A | 9/1997 | Wyckoff | |
| 5,716,706 A | 2/1998 | Morris | |
| 5,853,851 A | 12/1998 | Morris | |
| 6,245,700 B1 * | 6/2001 | Budd et al. | 501/34 |
| 6,335,083 B1 * | 1/2002 | Kasai et al. | 428/143 |

FOREIGN PATENT DOCUMENTS

| | | |
|---|---|---|
| DE | 209431 | 5/1984 |
| FR | 1404190 | 11/1965 |
| JP | 51055428 | 5/1976 |
| JP | 53-22513 | 3/1978 |
| JP | 53-88815 | 8/1978 |
| JP | 53102325 | 9/1978 |
| JP | 55-20254 | 2/1980 |
| JP | 55-20256 | 2/1980 |
| JP | 55126547 | 9/1980 |
| JP | 55126548 | 9/1980 |
| JP | 56-41852 | 4/1981 |
| JP | 60215549 | 10/1985 |
| JP | 61-68349 | 4/1986 |
| JP | 61270235 | 11/1986 |
| JP | 5-85771 | 4/1993 |
| WO | WO 96/33139 | 10/1996 |
| WO | WO 98/47830 | 10/1998 |

OTHER PUBLICATIONS

Ceram. Engr. Sci. Proc., 16, 1015–25 (1995). No Month.
Ceram. Engr. Sci. Proc., 16(2) 84–95 (1995). No Month.
Materials Science Research (1984), 17, 213. No Month.
Journal De Physiquie, Clolque Cl, supp. au n 2, Tome 47, fevrier 1986 p. C1–473. No Month.
F. Donald Bloss "An Introduction to the Methods of Optical Crystallography, " Holt, Rinehart and Winston, New York pp. 47–55 (1961). No Month.

* cited by examiner

Primary Examiner—Karl Group
(74) Attorney, Agent, or Firm—Carolyn A. Fischer

(57) ABSTRACT

The present invention relates to transparent microspheres (i.e., beads) that impart yellow color to retroreflected light. The microsphere preferably comprise titania plus alumina, zirconia, and/or silica and iron oxide, manganese oxide, or mixtures thereof. More particularly, the present invention relates to fused microspheres that impart yellow color to retroreflected light having both transparency and mechanical properties suitable, for example, for lens elements in retroreflective articles.

22 Claims, No Drawings

GLASS-CERAMIC MICROSPHERES THAT IMPART YELLOW COLOR TO RETROREFLECTED LIGHT

RELATED APPLICATIONS

This application is a continuation-in-part of U.S. patent application Ser. No. 09/362,323 filed Jul. 27, 1999, now U.S. Pat. No. 6,245,700 incorporated herein by reference.

FIELD OF THE INVENTION

The present invention relates to transparent microspheres (i.e., beads) that impart yellow color to retroreflected light. The microspheres preferably comprise titania plus alumina, zirconia, and/or silica and iron oxide, manganese oxide, and mixtures thereof. More particularly, the present invention relates to fused microspheres that impart yellow color to retroreflected light having both transparency and mechanical properties suitable, for example, for lens elements in retroreflective articles.

BACKGROUND

Transparent glass microspheres (i.e., beads) used in reflectors such as reflective sheets and road surface reflectors can be produced by, for example, melting methods. Such melting methods typically include melting a raw material composition in the form of particulate material. The liquid can then be quenched in water, dried, and crushed to form particles of a size desired for the final beads. The crushed particles are then passed through a flame having a temperature sufficient to melt and spheroidize the crushed particles. For most glasses this is a temperature of about 1000° C. to about 1450° C. Alternatively, the liquid can be poured into a jet of high velocity air. Beads are formed directly in the resulting stream. The velocity of the air is adjusted to control the size of the beads. These beads are normally composed of a vitreous material that is completely amorphous (i.e., noncrystalline), and hence, the beads are often referred to as "vitreous," "amorphous," or simply "glass" beads or microspheres.

Silica is a common component of glass-forming compositions. Alumina and zirconia have also been used in transparent glass beads to improve mechanical properties such as toughness, hardness, and strength. However, the amount of alumina and zirconia such beads can contain tends to be limited so as to avoid problems arising from crystallization, such as loss of transparency and processing difficulties. The most highly durable compositions comprise primarily alumina, zirconia, and silica with small amounts of modifiers (e.g., alkaline earth oxides). These compositions tend to have very high melting points and require special processing equipment such as a hydrogen flame or plasma torch. Lower melting compositions with high modifier content typically have poorer mechanical properties and provide only modest improvements over conventional glass beads. In addition, compositions with high modifier content (e.g., greater than about 25% by weight) can exhibit poor chemical durability. High durability fused beads described to date generally do not have a desirable refractive index unless the zirconia content is high (e.g., greater than about 55% by weight); however, high zirconia content tends to raise the melting point and the tendency to crystallize, creating difficulty in obtaining transparent microspheres without the use of a plasma gun or other specialized equipment.

Conventional barium titanate-based glass bead compositions are typically based on the compound $BaTiO_3$, or a $BaO/TiO_2$ eutectic, and can contain silica or a higher index oxide such as tin oxide or zinc oxide. They can contain greater than about 55% titania, although lower titania compositions comprising primarily lead oxide are also known. Barium titanate-based glass bead compositions are typically low durability glass beads, contain greater than 20% alkaline earth oxides, have not been or are not readily transformed to transparent beads with significant microcrystallinity, and generally contain little or no alumina and zirconia.

Retroreflective articles, and in particular pavement markings, can be found in several colors around the world. However, the most common colors are white and yellow (or yellow-orange). Achieving white retroreflection at night is obtained by the use of clear microspheres with a pigmented white background material or binder. For yellow retroreflection, clear beads can be used with background materials or binders that are pigmented heavily with yellow colorants.

Alternatively, a preferred approach for achieving yellow retroreflection is to employ yellow glass beads. For example, U.S. Pat. No. 3,294,559 (Searight) relates to glass compositions which have been found particularly suitable for the manufacture of retro-reflective lens elements to be used in illuminating yellow colored or yellow-orange colored objects.

U.S. Pat. No. 5,286,682 (Jacobs) relates to a pavement marking that has yellow-tinted, retroreflective beads partially embedded in a bead-carrier medium. The bead-carrier medium contains 0.5 to 15 volume percent of a light-scattering agent that scatters white light. The pavement marking is able to retroreflect a distinct yellow color at nighttime without using yellow pigments that contain cadmium, chromium and lead.

SUMMARY

The present invention relates to transparent solid beads (i.e., microspheres) having good mechanical properties characteristic of zirconia/alumina/silica (ZAS) compositions having a low modifier content (e.g., no greater than about 25% by weight of an alkaline earth oxide), higher refractive indices, lower melting temperatures, and improved quenching behavior. The transparent solid beads further comprise at least one transition metal such that the beads impart yellow color to retroreflected light. Preferably, the beads also exhibit a yellow ambient-lit color.

In one embodiment of the present invention, the yellow microspheres include titania plus alumina, zirconia, and/or silica in a total content of at least about 75% by weight, based on the total weight of the solid microspheres. The statement that the compositions include "titania plus alumina, zirconia, and/or silica" means that the compositions include titania and at least one of alumina, zirconia, and silica. Preferably, the total content of titania, alumina, and zirconia (which may not all be present in any one composition) is greater than the content of silica (if it is present). In a preferred embodiment, the titania content is at least about 10% by weight, and more preferably, no greater than about 50% by weight, based on the total weight of the solid microspheres.

The preferred concentration of transition metal oxide is somewhat dependent on the choice of colorant. For yellow beads comprising about 1% by weight to about 4% by weight of iron oxide as a transition metal colorant, the beads preferably comprise about 10 to about 70% by weight titania, about 5 to about 35% by weight zirconia, about 5 to about 40% by weight alumina, 0 to about 25% by weight silica, and 0 to about 25% by weight magnesium oxide, calcium oxide, or mixtures thereof. The amount of iron oxide present preferably ranges from about 2.0% by weight to about 4.0% by weight.

For yellow beads comprising about 1% by weight to about 4% by weight of manganese oxide as a transition metal colorant, the beads preferably comprise about 25 to about 70% by weight titania, about 5 to about 20% by weight zirconia, about 5 to about 30% by weight alumina, 0 to about 20% by weight silica, and 0 to about 25% by weight magnesium oxide, calcium oxide, or mixtures thereof. The amount of manganese oxide present preferably ranges from about 1% by weight to about 3% by weight of the total weight of the microspheres and more preferably ranges from greater than 1.0% by weight to less than 2.5% by weight.

Preferably, the yellow microspheres are glass-ceramic microspheres, which preferably have a nanoscale glass-ceramic microstructure. For certain preferred embodiments, the microspheres include a crystalline phase that includes a titanate compound (e.g., calcium titanate), titanium oxide, a zirconate compound, zirconium oxide, or combinations thereof.

The yellow microspheres preferably have an index of refraction of at least about 1.7 and are useful as lens elements in retroreflective articles. In one embodiment, glass-ceramic microspheres have an index of at least about 2.0 and are particularly useful for wet retroreflective articles.

Yet another preferred embodiment of the present invention includes fused, yellow microspheres. As used herein, "fused" microspheres refer to those that are prepared by a melt process, as opposed to a sol-gel process. Such fused microspheres may be completely amorphous (i.e., noncrystalline) or they may have crystalline and noncrystalline regions.

The present invention also provides a retroreflective article comprising transparent solid, yellow microspheres described above. One preferred article is a pavement marking tape comprising a backing and transparent, solid, yellow microspheres coated thereon. The present invention also provides a pavement marking comprising transparent, solid, yellow microspheres described above.

DETAILED DESCRIPTION OF PREFERRED EMBODIMENTS

The present invention provides transparent, solid, yellow, microspheres (i.e., beads) of various compositions containing titania and at least one of alumina, zirconia, and silica. It is preferable that the microspheres exhibit a relatively low liquidus temperature (preferably, no greater than about 1400° C., and more preferably, no greater than about 1300° C.), and form a clear, transparent glass when quenched. Also, preferred microspheres form a microcrystalline glass-ceramic structure via heat treatment yet remain transparent.

"Yellow microspheres" refers to microspheres that impart yellow color to retroreflected light. This property is also described herein as "yellow retroreflection" and "yellow retroreflective color". Preferably, the microspheres also exhibit a yellow ambient-lit color, meaning that the beads exhibit yellow coloration in the presence of natural sunlight. The specific color, the saturation of the color, and the retroreflective brightness can vary independently.

The retroreflective colorimetric characteristics can be described in terms of chromaticity coordinates x and y, measured according to ASTM E 811-87, as described in U.S. Pat. No. 5,286,682, incorporated herein by reference. Preferably, the x and y coordinates fall within a box on a chromaticity diagram wherein the box is defined by the (x,y) coordinates (0.458, 0.492), (0.480, 0.520), (0.610, 0.390), and (0.560, 0.390). The ambient-lit colorimetric characteristics can also be described using these same chromaticity coordinates. In either case, for yellow colors, combinations of x and y that sum to larger numbers are more saturated.

ASTM D 4061-89 is a standard test for measuring the retroreflectance, or retroreflective brightness, of pavement markings. For comparative characterization of the retroreflectance of transparent microspheres, a patch brightness value can be collected using a retroluminometer. The device directs white light of a known illuminance onto a planar monolayer of microspheres disposed on a white backing material at a fixed entrance angle to the normal to the monolayer. Retroreflected brightness, patch brightness, is measured by a photodetector at a specified divergence angle to the entrance angle (observation angle) in units of (Cd/m$^2$)/lux.

Upon initial formation from a melt, typically the beads are substantially amorphous (but can contain some crystallinity); however, upon further heat treatment, the beads can develop crystallinity in the form of a nanoscale glass-ceramic microstructure (i.e., microstructure in which a significant volume fraction of crystals less than about 100 nanometers in diameter has grown from within an initially amorphous structure). Surprisingly, even with this crystal formation, the compositions remain transparent. Preferably, the size of the crystals in the crystalline phase is less than about 20 nanometers (0.02 micron) in diameter. Crystals of this size are not typically effective light scatterers, and therefore, do not decrease the transparency significantly.

Typically, fused beads (i.e., those made from a melt process) comprise a dense, atomistically homogeneous glass network from which nanocrystals can nucleate and grow during subsequent heat treatment. Sol-gel beads typically comprise a mixture of amorphous material, such as sintered colloidal silica, and nanocrystalline components, such as zirconia, which crystallize during chemical precursor decomposition or sintering. The remaining amorphous matrix of sol-gel beads tends to be less resistant to further crystallization and opacification than that of fused beads. This is particularly true for alkaline earth containing compositions.

The terms "beads" and "microspheres" are used interchangeably and refer to particles that are substantially, although perhaps not exactly, spherical. The term "solid" refers to beads that are not hollow, i.e., they lack substantial cavities or voids. To be optionally useful as lens elements, the beads should be spherical and solid. Solid beads are typically more durable than hollow beads, particularly when exposed to freeze-thaw cycles.

The term "transparent" means that the beads when viewed under an optical microscope (e.g., at 100x) have the property of transmitting rays of visible light so that bodies beneath the beads, such as bodies of the same nature as the beads, can be clearly seen through the beads when both are immersed in oil of approximately the same refractive index as the beads. Although the oil should have a refractive index approximating that of the beads, it should not be so close that the beads seem to disappear (as they would in the case of a perfect index match). The outline, periphery, or edges of bodies beneath the beads are clearly discernible.

Transparent solid beads according to the present invention preferably have an index of refraction of at least about 1.7, more preferably, at least about 1.8, and most preferably, at least about 1.85. Preferably, for use in air, the beads have an index of refraction of no greater than about 2.0, and more preferably, no greater than about 1.95. Preferably, for use in water or a wet environment, the beads have a higher index of refraction, which is typically greater than about 2.0 and often as high as 2.2. Such beads are useful as lens elements in retroreflective articles. The index of refraction can be measured by the Becke method, which is disclosed in F. Donald Bloss, "An Introduction to the Methods of Optical Crystallography," Holt, Rinehart and Winston, New York pp. 47–55 (1961), incorporated herein by reference.

Beads of the invention can be made and used in various sizes, although about 50 microns ($\mu$m) to about 500 $\mu$m is typically desired. It is difficult to deliberately form beads smaller than 10 $\mu$m in diameter, though a fraction of beads down to 2 $\mu$m or 3 $\mu$m in diameter is sometimes formed as a by-product of manufacturing larger beads. Generally, the uses for beads call for them to be less than about 2 millimeters in diameter, and most often less than about 1 millimeter in diameter.

Transparent beads according to the present invention exhibit generally high hardness levels, generally high crush strengths, and high durability. For example, the Vickers hardness of the transparent beads is preferably at least about 800 kg/mm$^2$, more preferably at least about 900 kg/mm$^2$, most preferably at least about 1,000 kg/mm$^2$, and optimally at least about 1300 kg/mm$^2$. Although there is no particular limit on the upper limit of hardness, the hardness is typically no greater than about 2,000 kg/mm$^2$.

The crush strength values of the beads of the invention can be determined according to the test procedure described in U.S. Pat. No. 4,772,511 (Wood). Using this procedure, the beads demonstrate a crush strength of preferably at least about 690 MPa, more preferably at least about 960 MPa, and most preferably at least about 1240 MPa.

The durability of the beads of the invention can be demonstrated by exposing them to a compressed air driven stream of sand according to the test procedure described in U.S. Pat. No. 4,758,469 (Lange). Using this procedure, the beads are highly resistant to fracture, chipping, and abrasion, as evidenced by retention of about 50% to about 80% of their original reflected brightness.

Microsphere Compositions

As is common in the glass and ceramic art, the components of the beads are described as oxides, which is the form in which they are presumed to exist in the completed articles, and which correctly account for the chemical elements and their proportions in the beads. The starting materials used to make the beads may be some chemical compound other than an oxide, such as a carbonate, but the composition becomes modified to the oxide form during melting of the ingredients. Thus, the compositions of the beads of the present invention are discussed in terms of a theoretical oxide basis.

The formulations described herein are reported on a theoretical oxide basis based on the amounts of starting materials used. These values do not necessarily account for fugitive materials (e.g., fugitive intermediates) that are volatilized during the melting and spheroidizing process. Typically, for example, boria ($B_2O_3$), alkali metal oxides, and zinc oxide, are somewhat fugitive. Thus, if a finished product were analyzed there could be as much as a 5% loss of the original amount of boria and/or alkali metal oxide added to make the final microspheres. However, herein, as is conventional, all components of the final microspheres are calculated based on the amounts of starting materials and the total weight of the glass forming composition, and are reported in % by weights of oxides based on a theoretical basis.

Generally, transparent beads (preferably, fused beads) according to the present invention include titania plus alumina, zirconia, and/or silica. In addition, the transparent beads can include an alkaline earth metal oxide, such as baria, strontia, magnesia, or calcia. Moreover, the beads can include oxides of elements such as lithium, sodium, potassium, yttrium, tin, boron, and the like, either alone or in combination, provided they do not detrimentally impact the desired coloration and other desired properties of the beads. In certain preferred embodiments, no greater than about 25% by weight of these oxides is incorporated into the beads of the invention. More preferred embodiments contain less than 20% by weight alkaline earth oxides. Most preferred embodiments contain less than 15% by weight baria and/or strontia and optimally less than 10%. It is also preferred that alkali metal oxides be included in the beads in no more than about 10% by weight.

In the compositions in which the total content of more than one component is discussed, the beads can include only one of the components listed, various combinations of the components listed, or all of the components listed. For example, if a bead composition is said to include a total content of alumina and zirconia in an amount of 40% by weight, it can include 40% by weight alumina, 40% by weight zirconia, or 40% by weight of alumina plus zirconia.

In a preferred embodiment, transparent beads according to the present invention include titania plus zirconia, alumina, and/or silica in a total amount of at least about 75% by weight, based on the total weight of the beads. Preferably, the total content of these components is at least about 80% by weight.

Generally, zirconia and alumina are known to provide high hardness and strength to ceramic articles. Silica is useful as a glass former, and provides some reduction in liquidus temperature when combined with alumina and zirconia. However, silica has a low refractive index and even the useful low melting region in the zirconia/alumina/silica (ZAS) ternary system has a relatively high liquidus temperature of about 1750° C.

Titania is a high refractive index oxide with a melting point of 1840° C., and is typically used because of its optical and electrical properties, but not generally for hardness or strength. Similar to zirconia, titania is a strong nucleating agent known to cause crystallization of glass compositions. Despite its high individual melting point, as a fourth component added to the ZAS system, titania further lowers the liquidus temperature, while significantly raising the refractive index of ZAS compositions. Remarkably, the mechanical properties of lower melting titania containing beads are excellent or even significantly improved, even for compositions in which the alumina content is low (for example, about 20%) and for which the combined amount of alumina plus zirconia is low (for example, about 40%). Further, quaternary compositions containing titania are readily quenched to glasses and controllably crystallized to glass-ceramics, even when the zirconia content is high (for example, greater than about 40%), and even when the combined zirconia plus titania content is greater than 50%. Hence, compositions of the present invention containing titania plus one or more of alumina, zirconia, and silica provide relatively low liquidus temperatures, high refractive indices, high crystallinity, excellent mechanical properties, and high transparency.

In the compositions of the present invention, the combined amount of titania, zirconia, and alumina is greater than the amount of silica. Titania, zirconia, and alumina provide crystalline phases or high hardness that improve mechanical properties. Compositions that contain too much silica tend to have undesirably low refractive indices. The ratio of the total weight of alumina plus zirconia plus titania to the weight of silica, namely (alumina+zirconia+titania)/silica, is preferably at least about 1.2, and more preferably, at least about 2. More preferably, the ratio is within a range of about 3 to about 7. If this ratio of alumina plus zirconia plus titania to silica is too small, the effect of increasing bead hardness will decrease. Conversely, if this ratio is too large, there is the risk of impairing bead transparency.

The alumina content is preferably no greater than about 70%, and the zirconia content is preferably no greater than about 50%, based on the total weight of the solid microspheres. Preferably, the total content of alumina and zirconia is at least about 5% by weight, more preferably, at least about 10% by weight, even more preferably, at least about 20% by weight, even more preferably, at least about 25% by weight, and most preferably, at least about 40% by weight, based on the total weight of the solid microspheres.

Preferably, the titania content of transparent beads according to the present invention is at least about 10% by weight, based on the total weight of the solid microspheres. For certain preferred embodiments, particularly glass beads with good mechanical properties, the titania content is no greater than about 50% by weight. For other embodiments, particularly high refractive index glass-ceramic beads, the titania content can be greater than about 50% by weight. Although such glass-ceramic beads may have poorer mechanical properties, they typically have an index of refraction of greater than about 2.0 and are useful for wet reflection. More preferably, the titania content is about 15% to about 40% by weight, and most preferably, about 15% to about 35% by weight, based on the total weight of the solid microspheres. As stated above, titania lowers the liquidus temperature and increases the refractive index versus ZAS compositions. Titania also provides bead compositions with greater crystallinity, without destroying the ability to form a glass during quenching, and to maintain transparency during crystallization.

While beads with ZAS compositions tend to contain primarily zirconia as a crystalline phase, compositions of the present invention typically comprise one or more of zirconia, zirconium titanate, other zirconates, rutile, other titanias and titanates, and other phases following crystallization. Titanium is a variable valence transition metal that forms oxides of varying oxygen content depending on conditions. Titania tends to lose oxygen and becomes a black semiconducting material when exposed to high temperatures and quenched. Bead compositions of the invention are typically dark, blue, or black as quenched, but can be reoxidized and rendered free of the dark, blue, or black color by heat treatment. The bead compositions exhibit controlled crystallization characteristics such that they remain transparent following such heat treatments. Accordingly, such heat treatments can be performed that simultaneously remove color and develop desired microcrystallinity within the beads. Generally, beads with compositions containing greater than 50% titania can require a higher heat treatment temperature than those beads with compositions containing less titania to remove color and can tend to crystallize and develop translucency or opacity. Hence, compositions high in titania generally contain calcia or other additives which improve the ability to reoxidize the beads.

Preferably, the silica content of transparent fused beads according to the present invention is less than the total content of alumina plus zirconia plus titania. Typically, if silica is present, it is present in an amount of no greater than about 40% by weight, based on the total weight of the solid microspheres. More preferably, the silica content is within a range of about 5% to about 35% by weight. If the silica content is less than 5% by weight, there is a risk of the transparency of the beads being detrimentally affected and the liquidus temperature being too high. Conversely, if the silica content exceeds 35% by weight, there is a risk of the mechanical properties being detrimentally affected or the refractive index being too low. Most preferably, the silica content is within a range of about 10% to about 30% by weight, based on the total weight of the solid microspheres.

Alkaline earth modifiers are particularly useful for glass formation during quenching, widening the process window for removing the dark, blue, or black color while maintaining transparency, and lowering the liquidus temperature. Surprisingly, the ability to quench to a clear glass is improved, even though the tendency to crystallize on annealing is increased. The temperature at which dark coloration from titania is removed is significantly lowered by alkaline earth additions. Magnesia and other alkaline earths also can result in improved crush strength, possibly by controlling crystallization during the heat treatment step and influencing the resulting microstructure. Too much alkaline earth oxide can result in poorer mechanical strength or poor chemical resistance to acidic environments. Accordingly, the beads contain no greater than about 25% by weight alkaline earth oxides, based on the total weight of the solid microspheres.

Colorants can also be included in the beads of the present invention. Such colorants include, for example, $CeO_2$, $Fe_2O_3$, $CoO$, $Cr_2O_3$, $NiO$, $CuO$, $MnO_2$, and the like. Typically, the beads of the present invention include no more than about 5% by weight, preferably no more than about 1% by weight, colorant, based on the total weight of the beads (theoretical oxide basis). Also, rare earth elements, such as europium, can be included for fluorescence. Transition metal oxides are typically preferred for methods of coloration wherein the colorant is combined with a base composition, prior to forming the beads. As used herein, "base composition" refers to the composition absent the transition metal colorant. For other methods, however, transition metal salts, as well as elemental transition metals, may be employed.

For instances wherein yellow microspheres are desired, iron oxide, manganese oxide, and mixtures thereof, are preferred. The ambient-lit color rendered to the microspheres by the addition of manganese oxide and/or iron oxide, as well as the retroreflective color when the microspheres are included as focusing elements in a retroreflective construction, is related to the base composition as well as to the heat treatment conditions employed during the manufacture of the microspheres. Preferred yellow ambient-lit color and yellow retroreflective color is typically generated during the formation of the crystallized glass-ceramic microstructure. For example, some base compositions doped with manganese oxide exhibit an unsaturated yellow ambient-lit color and nearly colorless retroreflection, while microspheres of the same composition that have been devitrified by a subsequent heat-treatment exhibit a saturated yellow ambient-lit color and yellow retroreflective color. Specifically, a base composition containing 14.5% $ZrO_2$, 25.5% $Al_2O_3$, 15.8% $SiO_2$, 31% $TiO_2$, 1.7% $MgO$ and 11.5% $CaO$ (% by weight based on the total weight of the bead) exhibits this particular color behavior.

Alternatively, for other base compositions, fused glass microspheres doped with manganese oxide will exhibit a saturated yellow ambient-lit color and yellow retroreflective color, while microspheres of the same composition that have been devitrified by a subsequent heat treatment will exhibit a tan or golden brown ambient-lit and retroreflective color. A base composition containing 7.9% $ZrO_2$, 9.3% $Al_2O_3$, 2.6% $SiO_2$, 65.7% $TiO_2$, and 14.5% CaO is illustrative of such color behavior.

Preferred microspheres that contain iron oxide as the colorant exhibit a difference in the saturation of color between their ambient-lit color and their retroreflective color. Iron oxide-containing beads typically exhibit a saturated yellow retroreflective color in spite of being very weakly colored (unsaturated) in terms of their ambient-lit color. This particular color behavior is exemplified by a base composition containing 14.5% $ZrO_2$, 25.5% $Al_2O_3$, 15.6% $SiO_2$, 31% $TiO_2$, 1.7% MgO and 11.5% CaO.

Alternatively, for other base compositions, doping with iron oxide yields devitrified microspheres exhibiting saturated yellow coloration in terms their ambient-lit in addition to their retroreflective color. For example, a base composition containing 7.9% $ZrO_2$, 9.3% $Al_2O_3$, 2.6% $SiO_2$, 65.7% $TiO_2$, 14.5% CaO has been found to exhibit this particular coloration. In comparison to the base formulation previously described, that exhibited a weakly colored ambient-lit appearance, higher titania (or titania plus zirconia), or lower silica (or silica plus magnesia), base compositions are surmised to be preferred for iron oxide containing yellow microspheres.

Preferred glass-ceramic beads of the present invention that contain manganese oxide, iron oxide, and mixtures thereof are devitrified using post-forming heat-treatment conditions that lead to measurable crystallinity by x-ray diffraction, but that lead specifically to very little or no internal scattering of light, detectable using an optical microscope, by microstructure features such as crystal grains. However, a small but observable amount of internal light-scattering, is also acceptable provided that the retroreflective brightness of the bead is not substantially diminished.

Preparation of Microspheres

Microspheres according to the invention can be prepared by conventional processes as, for example, disclosed in U.S. Pat. No. 3,493,403 (Tung et al). In one useful process, the starting materials are measured out in particulate form, each starting material being preferably about 0.01 $\mu$m to about 50 $\mu$m in size, and intimately mixed together. The starting raw materials include compounds that form oxides upon melting or heat treatment. These can include oxides (e.g., silica, alumina, zirconia, titania), hydroxides, acid chlorides, chlorides, nitrates, acetates, sulfates, and the like, which can be used either alone or in combination of two or more types. Moreover, compound oxides such as mullite ($3Al_2O_3.2SiO_2$) and zircon ($ZrO_2.SiO_2$) can also be used either alone or in combination with the above-mentioned raw materials.

They are then melted in a gas-fired or electrical furnace until all the starting materials are in liquid form. The liquid batch can be poured into a jet of high-velocity air. Beads of the desired size are formed directly in the resulting stream. The velocity of the air is adjusted in this method to cause a proportion of the beads formed to have the desired dimensions. Typically, such compositions have a sufficiently low viscosity and high surface tension.

Melting of the starting materials is typically performed by heating at a temperature within a range of about 1500° C. to about 1900° C., and often at a temperature of, for example, about 1700° C. A direct heating method using a hydrogen-oxygen burner or acetylene-oxygen burner, or an oven heating method using an arc image oven, solar oven, graphite oven or zirconia oven, can be used to melt the starting materials.

Alternatively, the liquid is quenched in water, dried, and crushed to form particles of a size desired for the final beads. The crushed particles can be screened to assure that they are in the proper range of sizes. The crushed particles can then be passed through a flame having a temperature sufficient to remelt and spheroidize the particles.

In a preferred method, the starting materials are first formed into larger feed particles. The feed particles are fed directly into a burner, such as a hydrogen-oxygen burner or an acetylene-oxygen burner or a methane-air burner, and then quenched in water (e.g., in the form of a water curtain or water bath). Feed particles may be formed by melting and grinding, agglomerating, or sintering the starting materials. Agglomerated particles of up to about 500 $\mu$m in size (the length of the largest dimension) can be used. The agglomerated particles can be made by a variety of well known methods, such as by mixing with water, spray drying, pelletizing, and the like. The starting material, particularly if in the form of agglomerates, can be classified for better control of the particle size of the resultant beads. Whether agglomerated or not, the starting material may be fed into the burner with the burner flame in a horizontal position. Typically, the feed particles are fed into the flame at its base. This horizontal position is desired because it can produce very high yields (e.g., 100%) of spherical particles of the desired level of transparency.

The procedure for cooling the molten droplets can involve air cooling or rapid cooling. Rapid cooling is performed by, for example, dropping the molten droplets of starting material into a cooling medium such as water or cooling oil. In addition, a method can also be used in which the molten droplets are sprayed into a gas such as air or argon. The resultant quenched fused beads are typically sufficiently transparent for use as lens elements in retroreflective articles. For certain embodiments, they are also sufficiently hard, strong, and tough for direct use in retroreflective articles. Typically, however, a subsequent heat treating step is desired to improve their mechanical properties.

In a preferred embodiment, a bead precursor can be formed and subsequently heated. As used herein, a "bead precursor" refers to the material formed into the shape of a bead by melting and cooling a bead starting composition. This bead precursor is also referred to herein as a quenched fused bead, and may be suitable for use without further processing if the mechanical properties and transparency are of desirable levels. The bead precursor is formed by melting a starting composition containing prescribed amounts of raw materials (e.g., titanium raw material, silicon raw material, aluminum raw material, and zirconium raw material), forming molten droplets of a predetermined particle size, and cooling those molten droplets. The starting composition is prepared so that the resulting bead precursor contains the desired raw materials in a predetermined ratio. The particle size of the molten droplets is normally within the range of about 10 microns ($\mu$m) to about 2,000 $\mu$m. The particle size of the bead precursors as well as the particle size of the final transparent fused beads can be controlled with the particle size of the molten droplets.

Thus, in certain preferred embodiments, a bead precursor (i.e., quenched fused bead) is subsequently heated. Preferably, this heating step is carried out at a temperature below the melting point of the bead precursor. Typically, this temperature is at least about 750° C. Preferably, it is about 850° C. to about 1100° C., provided it does not exceed the melting point of the bead precursor. If the heating temperature of the bead precursor is too low, the effect of increasing the mechanical properties of the resulting beads will be insufficient. Conversely, if the heating temperature is too high, there is the risk of transparency decreasing. Although there are no particular limitations on the time of this heating step to improve mechanical properties, normally heating for at least about 1 minute is sufficient, and heating should preferably be performed for about 5 minutes to about 100 minutes. In addition, preheating (e.g., for about 1 hour) at a temperature within the range of about 600° C. to about 800° C. before heat treatment is advantageous because it can further increase the transparency and mechanical properties of the beads.

This method is also suitable for growing fine crystal phases in a uniformly dispersed state within a phase that contains, for example, alumina and silica as its main components. A crystal phase containing oxides of zirconium, titanium, etc., can also form in compositions containing high levels of zirconia or titania upon forming the beads from the melt (i.e., without subsequent heating). Significantly, the crystal phases are more readily formed (either directly from the melt or upon subsequent heat treatment) by including an alkaline earth metal oxide (e.g., calcium oxide or a substance such as calcium carbonate that forms calcium oxide following melting or heat treatment) in the starting composition.

Preferred heat treatment temperatures vary depending on the type and concentration of transition metals colorant employed. For example, in the case of iron oxide, heat treatment temperatures ranging from about 825° C. to about 925° C. are preferred for $Fe_2O_3$ concentrations ranging from about 2.0 to about 4.0% by weight. Further, in the case of $MnO_2$, treatment temperatures ranging from about 800° C. to abut 850° C. are preferred, particularly for concentrations of about 2.0% by weight and higher.

Although it is generally preferred to incorporate the transition metal oxide colorant directly into the bead composition prior to formation of the beads, colored beads can alternatively be formed by tinting uncolored beads. In this embodiment, a dispersion of the colorant (e.g. transition metal oxide) is formed and coated onto the exterior portion of the beads. Water soluble salts of transition metals as well as metal-organic compounds are preferred. The coating is then flame-treated to incorporate the colorant into the bead. Yet another approach is to inject the transition metal colorant, particularly a salt of the desired transition metal, into the flame during the formation of the beads.

Transparent (preferably, fused) beads according to the present invention can be incorporated into coating compositions (see, e.g., U.S. Pat. No. 3,410,185 (Harrington); U.S. Pat. No. 2,963,378 (Palmquist et al.); and U.S. Pat. No. 3,228,897 (Nellessen)), which generally include a film-forming binding material in which the beads are dispersed. Alternatively, the beads can be used in drop-on applications for painted lines as in pavement markings.

Beads of the present invention are particularly useful in pavement-marking sheet material (tapes) as described in U.S. Pat. No. 4,248,932 (Tung et al.), and other retroreflective assemblies, such as those disclosed in U.S. Pat. Nos. 5,268,789 (Bradshaw), 5,310,278 (Kaczmarczik et al.), 5,286,682 (Jacobs et al.), and 5,227,221 (Hedblom). They can be used in exposed lens, encapsulated lens, or embedded lens sheeting.

As taught, for example, in U.S. Pat. No. 2,354,018 (Heltzer et al.) or U.S. Pat. No. 3,915,771 (Gatzke et al.) sheeting useful for pavement markings generally includes a backing, a layer of binder material, and a layer of beads partially embedded in the layer of binder material. The backing, which is typically of a thickness of less than about 3 mm, can be made from various materials, e.g., polymeric films, metal foils, and fiber-based sheets. Suitable polymeric materials include acrylonitrile-butadiene polymers, millable polyurethanes, and neoprene rubber. The backing can also include particulate fillers or skid resistant particles. The binder material can include various materials, e.g., vinyl polymers, polyurethanes, epoxides, and polyesters, optionally with colorants such as inorganic pigments. The pavement marking sheeting can also include an adhesive, e.g., a pressure sensitive adhesive, a contact adhesive, or a hot melt adhesive, on the bottom of the backing sheet.

During retroreflection, the incident light passes through the retroreflective bead(s), and is focused in a region adjacent the bead opposite to where the incident light entered the bead(s). In this region, the light is scattered by a light-scattering agent such as a white pigment, typically in a diffuse manner. Some of the scattered light is then collected by the bead and is refocused to travel back along the incident path. There must be sufficient light-scattering in the region opposite to where the incident light entered the bead if retroreflection is to be realized.

Pavement marking sheetings can be made by a variety of known processes. A representative example of such a process includes coating onto a backing sheet a mixture of resin, pigment, and solvent, dropping beads according to the present invention onto the wet surface of the backing, and curing the construction. A layer of adhesive can then be coated onto the bottom of the backing sheet.

In addition to pavement marking applications, the beads are useful in reflective sheeting applications such as traffic signs, reflective graphics, apparel, and personal safety articles.

EXAMPLES

The following examples further illustrate the invention. All percentages are in % by weights, based on the total weight of the microspheres, unless specified otherwise.

Test Methods

Patch brightness values were determined using a retroluminometer. The device directs white light onto a planar monolayer of microspheres disposed on a white backing material at a fixed entrance angle to the normal to the monolayer. Retroreflective brightness, patch brightness, is measured by a photodetector at a fixed divergence angle to the entrance angle (observation angle) in units of $(Cd/m^2)/lux$. Data reported herein were measured at −4° entrance angle and 0.2° observation angle. Retroreflective brightness measurements were made for the purpose of comparison of brightness between beads of different composition. Hence, the values were normalized by dividing by a constant factor greater than the highest measured value.

Example 1

Zirconium oxide, commercially available from Z-TECH division of Carpenter Engineering Products, (Bow, N.H.) under the trade designation "CF-PLUS-HM"; aluminum oxide, commercially available from ALCOA Industrial Chemicals, (Pittsburgh, Pa.) under the trade designation "16SG"; titanium oxide, commercially available from KRONOS, (Cranbury, N.J.) under the trade designation "KRONOS 1000"; wollastonite, commercially available from NYCO Minerals, (Willsboro, N.Y.) under the trade designation "NYAD 1250"; and talc commercially available from Luzenac America, (Englewood, Colo.) under the trade designation "Cimpact 610" were combined in a porcelain jar mill with 350 g of water and 1600 g of 1 cm diameter zirconium oxide milling media. The ingredients were combined in appropriate proportions for the preparation of beads with the following base composition:

| | |
|---|---|
| $ZrO_2$ | 14.5% |
| $Al_2O_3$ | 25.5% |
| $SiO_2$ | 17.6% |
| $TiO_2$ | 31.0% |
| CaO | 5.8% |
| MgO | 5.6% |

To the slurry was added, 0.5% equivalent $Fe_2O_3$ from $Fe(NO_3)_3\text{-}9H_2O$ commercially available from Fisher (Fair Lawn, N.J.) under the trade designation "I110-500". The slurry was milled for 3 hours and then dried to yield a mixed powder cake with the components homogeneously distributed. After grinding with a mortar and pestle, dried and sized particles, were fed into a hydrogen/oxygen torch flame commercially available from Bethlehem Apparatus Company, Hellertown, Pa. under the trade designation "Bethlehem Bench Burner PM2D Model-B", referred to as "Bethlehem burner" hereinafter. The Bethlehem burner delivered hydrogen and oxygen at the following rates, standard liters per minute (SLPM):

| | Hydrogen | Oxygen |
|---|---|---|
| Inner ring | 8.0 | 3.0 |
| Outer ring | 23.0 | 9.8 |
| Total | 31.0 | 12.8 |

The melted particles were melted and transported to a water quenching vessel. For devitrification, the quenched glass beads were placed in alumina crucibles and subjected to heat treatments in a furnace by ramping the temperature up from room temperature to the prescribed temperature at a rate of 10° C./minute, maintaining the prescribed temperature for the prescribed "hold" time, and then allowing the furnace to cool slowly through natural dissipation of heat into the environment. The beads were removed from the furnace after cooling back to room temperature.

For a heat treatment of 975° C. and a hold time of 30 minutes, the beads were slightly hazy in appearance under an optical microscope and had a very pale (unsaturated) off-white/yellow ambient-lit appearance. The beads imparted a distinctly brilliant yellow color to retroreflected light, when spread as a monolayer onto a white diffuse reflector and illuminated with white light. Higher heat treatment temperatures and longer hold times resulted in substantially more opaque beads, less useful for generating bright retroreflection. Lower heat treatment temperatures and shorter hold times resulted in glass-ceramic beads that were either red-to-brown in color or off-white in color.

Examples 2–4

Examples 2–4 employed the same zirconium oxide powder and aluminum oxide as Example 1. The titanium oxide was provided as titanium oxide ($TiO_2$) powder, commercially available from SCM Chemicals (Baltimore, Md.) under the trade designation "RG BG0050". The calcium oxide was provided as a mixture of calcium carbonate ($CaCO_3$) powder, commercially available from EM Science (Gibbstown, N.J.) under the trade designation "CX0110-1" and wollastonite ($CaSiO_3$) powder, commercially from R.T. Vanderbilt (Norwalk, Conn.) under the trade designation "Vansil W-30". The silicon oxide was also provided from the wollastonite. The ingredients were combined in appropriate proportions for the preparation of beads with the following base composition.

| | |
|---|---|
| $ZrO_2$ | 7.9% |
| $Al_2O_3$ | 9.3% |
| $SiO_2$ | 2.6% |
| $TiO_2$ | 65.7% |
| CaO | 14.5% |

Iron oxide, provided as magnetite ($Fe_3O_4$) powder, commercially available from Aldrich Chemical Company (Milwaukee, Wis.) under the trade designation "31,006-9" was added to the base composition at the following concentrations.

Example 2—2.2% by weight $Fe_2O_3$ equivalent

Example 3—3.0% by weight $Fe_2O_3$ equivalent

Example 4—4.0% by weight $Fe_2O_3$ equivalent

Examples 2–4 included sodium carboxymethylcellulose, commercially available from the Aqualon Division of Hercules Incorporated (Hopewell, Va.) under the trade designation "CMC 7L2C", at a concentration of 1.5%.

For Example 2, the raw materials were milled for two hours in deionized water at slurry loadings of 55% by weight in a Svegvari attritor mill, commercially available from Union Process, (Akron, Ohio) at a 50% power setting using $\frac{3}{16}$ inch (0.48 cm) diameter spherical alumina media. For Examples 3 and 4, the raw materials were milled under the same conditions as Example 1. Additionally for Examples 3 and 4, the raw materials were milled a second time for three hours by rolling in a 500 ml polyethylene bottle with $\frac{3}{8}$ inch (0.95 cm) cylindrical zirconia media, on a mill rack, commercially available from U.S. Stoneware (East Palestine, Ohio) at a speed setting of 70. For the second milling, the raw materials were dispersed in deionized water at a slurry loading of 33% by weight. After the milling steps, each of the slurries were dried at 85–100° C. for 3 hours in a drying oven. The dried solids were crushed using a mortar and pestle and screen sieved to a size of less than 160 microns diameter. To form microspheres, each of the powder agglomerates were fed directly into a the flame of a Bethlehem burner with the following gas flows (in standard liters per minute):

| | hydrogen | oxygen |
|---|---|---|
| inner ring | 8.0 | 3.0 |
| outer ring | 23.0 | 9.8 |
| TOTAL | 31.0 | 12.8 |

The flame-formed beads were transported by the flame to a water-quenching vessel, and then collected. For devitrification, the quenched glass beads were placed in ceramic crucibles and subjected to heat treatments as described in Example 1.

For a heat treatment temperature of 870° C. and a hold time of 60 minutes, the beads with a $Fe_2O_3$ content of 3.0% (Example 3) exhibited a saturated yellow ambient-lit color and imparted a distinctly yellow color to retroreflected light, when spread as a monolayer onto a white diffuse reflector and illuminated with white light. In the case of Example 2, similar yellow ambient-lit colored beads and yellow retroreflection were obtained, but the yellow colors were less saturated. For 4.0% by weight equivalents $Fe_2O_3$, the beads exhibited a darker yellow-brown color and yellow retroreflection. The retroreflective brightness for the beads of Example 4 was distinctly lower than Example 3.

Examples 5–8

"CF-PLUS-HM" zirconium oxide, "16SG" aluminum oxide, "KRONOS 1000" titanium oxide, "Vansil W-30" wollastonite, and talc commercially available from Luzenac America, (Englewood, Colo.) under the trade designation "Suprafino H", were combined in a porcelain jar mill with 350 g of water and 1600 g of ⅜ in cylindrical zirconium oxide milling media. The ingredients were combined in appropriate proportions for the preparation of beads with the following base composition:

| | |
|---|---|
| $ZrO_2$ | 14.5% |
| $Al_2O_3$ | 25.5% |
| $SiO_2$ | 15.8% |
| $TiO_2$ | 31.0% |
| CaO | 11.5% |
| MgO | 1.7% |

In four separate batches, manganese oxide, commercially available from Aldrich Chemical Company, (Milwaukee, Wis.) under the trade designation "21,764-6" was added at 0.1, 0.5, 1.0, and 2.0% by weight. The slurry included sodium carboxymethylcellulose, commercially available from the Aqualon Division of Hercules Incorporated (Hopewell, Va.) under the trade designation "CMC 7L2C", added at a level of 1.5%. Each batch was wet-milled for 3 hours, using a porcelain jar mill and ⅜" cylindrical zirconia media, and then dried to yield a mixed powder cake with the components homogeneously distributed. After grinding with a mortar and pestle, some of the multiphase particles were fed into a Bethlehem burner, delivering hydrogen and oxygen at the following rates in standard liters per minute (SLPM):

| | Hydrogen | Oxygen |
|---|---|---|
| Inner ring | 8.0 | 3.0 |
| Outer ring | 23.0 | 9.8 |
| Total | 31.0 | 12.8 |

The dried and sized particles were fed directly into the flame, where the particles were melted and transported to a water quenching vessel. For devitrification, the quenched glass beads were heat treated as previously described. For a heat treatment temperature of 850° C. and a hold time of 60 minutes, the beads exhibited a saturated yellow color and imparted a saturated yellow color to retroreflected light, when spread as a monolayer onto a white diffuse reflector and illuminated with white light. The beads generated were substantially free of internal light-scattering features, as observed under an optical microscope. Table I, as follows, depicts the patch brightness for 53–88 micron beads from each of the four samples. The four glass-ceramic bead samples shared a similar yellow color, and varied only in the saturation of that color. The sample containing 1% by weight manganese oxide exhibited a slightly higher patch brightness than the 0.1 and 0.5% by weight samples, whereas the 2% by weight sample exhibited a substantial reduction in patch brightness.

TABLE I

| % by weight $MnO_2$ | Relative Retroreflective Brightness |
|---|---|
| 0.1 | 0.86 |
| 0.5 | 0.85 |
| 1.0 | 0.93 |
| 2.0 | 0.50 |

For some combinations of temperature and time that were higher and longer, respectively, the beads generated became hazy and tan or brown in color. The latter, therefore, were less useful for generating bright and yellow retroreflection. For some combinations of temperature and time that were lower and shorter, respectively, beads that were still substantially amorphous were produced. The latter were much more pale in their ambient-lit yellow color, and imparted little or no yellow color to retroreflected light.

Example 9

Zirconium oxide, commercially available from Aldrich Chemical Company (Milwaukee, Wis.) under the trade designation "23,069-3", "16SG" aluminum oxide, "RG BG0050" titanium oxide, "Vansil W-30" wollastonite, and "Suprafino H" talc were combined in appropriate proportions for the preparation of beads with the following base composition:

| | |
|---|---|
| $ZrO_2$ | 14.5% |
| $Al_2O_3$ | 25.5% |
| $SiO_2$ | 15.8% |
| $TiO_2$ | 31.0% |
| MgO | 1.7% |
| CaO | 11.5% |

To the base composition, 0.5% of $MnO_2$ was added as manganese oxide ("21,764-6") and 1.0% equivalent $Fe_2O_3$ was added as iron oxide "31,006-9." "CMC 7L2C" sodium carboxymethylcellulose was added at a level of 1.5% by weight of the solids. The raw materials were milled for two hours in deionized water at a slurry loading of 55% by weight in a Svegvari attritor mill at a 50% power setting using 3/16 inch (0.48 cm) diameter spherical alumina media. The milled powders were dried, sized, and flame-formed twice using a Bethlehem burner, as described previously. After forming, the beads were heat-treated as previously described employing a heat treatment temperature 965° C. and a hold time of 60 minutes. The beads imparted a yellow color to retroreflected light, when spread as a monolayer onto a white diffuse reflector and illuminated with white light. When collected in a transparent container, the beads were tan in ambient appearance. When disposed on the white diffuse reflector, the beads took on a golden appearance.

What is claimed is:

1. Transparent solid microspheres comprising:
   titania and at least one of alumina, zirconia, and silica; and
   up to about 5% by weight of iron oxide, manganese oxide, and mixtures thereof;
   wherein the total content of the titania plus alumina, zirconia, and/or silica is at least about 75% by weight, the total content of titania, alumina, and zirconia is greater than the content of silica, and the titania content is about 10% by weight to about 50% by weight, based on the total weight of the microspheres.

2. The microspheres of claim 1 wherein iron oxide is present in an amount ranging from about 2.0 wt-% to about 4.0 wt-%.

3. The microspheres of claim 1 wherein manganese oxide is present in an amount ranging from an amount ranging from about 1.0 wt-% to about 3.0 wt-%.

4. The microspheres of claim 1 wherein manganese oxide is present in an amount ranging from greater than 1.0 wt-% to less than 2.5 wt-%.

5. The microspheres of claim 1 wherein the microspheres comprise a microcrystalline glass-ceramic microstructure.

6. The microspheres of claim 7, wherein the microcrystalline glass-ceramic structure has crystals having a diameter of less than about 100 nanometers.

7. The microspheres of claim 1, wherein the microcrystalline glass-ceramic structure is a nanocrystalline microstructure.

8. The microspheres of claim 1, having an index of refraction is at least about 1.7.

9. The microspheres of claim 1, having an index of refraction is at least about 1.8.

10. The microspheres of claim 1, having an index of refraction is at least about 1.8 and no greater than about 2.

11. Transparent solid, microspheres comprising a microcrystalline glass-ceramic structure, said microspheres comprising:

titania and at least one of alumina, zirconia, and silica; and up to about 5% by weight of iron oxide, manganese oxide, and mixtures thereof;

wherein the total content of the titania plus alumina, zirconia and/or silica is at least about 75% by weight, the total content of titania, alumina, and zirconia is greater than the content of silica, and the titania content is present is an amount of at least about 10% by weight, based on the total weight of the solid microspheres.

12. The microspheres of claim 11 wherein said microspheres are fused.

13. The microspheres of claim 11 comprising:

about 10 to about 70% by weight of titania;

about 5 to about 35% by weight of zirconia;

about 5 to about 40% by weight of alumina;

0 to about 25% by weight of silica;

0 to about 25 of alkaline earth oxide; and about 1 to about 4% by weight of iron oxide.

14. The microspheres of claim 11 comprising:

about 25 to about 70% by weight of titania;

about 5 to about 20% by weight of zirconia;

about 5 to about 30% by weight of alumina;

0 to about 20% by weight of silica;

0 to about 25 of alkaline earth oxide; and about 1 to about 4% by weight of manganese oxide.

15. The transparent glass-ceramic microspheres of claim 11, having an index of refraction is at least about 1.7.

16. The transparent glass-ceramic microspheres of claim 11, having an index of refraction is at least about 2.0.

17. A retroreflective article, comprising the microspheres of claim 1.

18. A retroreflective article, comprising the microspheres of claim 11.

19. A pavement marking, comprising the microspheres of claim 1.

20. A pavement marking, comprising the microspheres of claim 11.

21. The microspheres of claim 1 wherein said microspheres are fused.

22. The microspheres of claim 5 wherein said microspheres are fused.

* * * * *

UNITED STATES PATENT AND TRADEMARK OFFICE
CERTIFICATE OF CORRECTION

PATENT NO.     : 6,479,417 B2
DATED          : November 12, 2002
INVENTOR(S)    : Frey, Matthew H. et al.

It is certified that error appears in the above-identified patent and that said Letters Patent is hereby corrected as shown below:

Title page,
Item [75], Inventors, insert -- ,Kanagawa -- preceding "(JP)", delete "Zama" and insert in place thereof -- Zama-City, Kanagawa --.
Item [56], References Cited, U.S. PATENT DOCUMENTS, delete "12/1966" and insert in place thereof -- 4/1963 --.
FOREIGN PATENT DOCUMENTS, insert -- Pending U.S. Patent Application Serial No. 09/062,045 filed April 17, 1998 --.

Column 9,
Line 16, insert -- of -- following "terms".
Line 21, delete "," following "described".

Column 11,
Line 31, delete "abut" and insert in place thereof -- about --.
Line 44, insert -- Applications --.

Column 13,
Line 19, delete "," preceding "were".

Column 14,
Line 1, insert -- available -- preceding "from".
Line 46, delete "a" preceding "the".

Column 17,
Line 18, delete "1" and insert in place thereof -- 7 --.

Signed and Sealed this

Second Day of September, 2003

JAMES E. ROGAN
*Director of the United States Patent and Trademark Office*